US007262775B2

(12) United States Patent
Calkins et al.

(10) Patent No.: US 7,262,775 B2
(45) Date of Patent: Aug. 28, 2007

(54) SYSTEM SUPPORTING ANIMATION OF GRAPHICAL DISPLAY ELEMENTS THROUGH ANIMATION OBJECT INSTANCES

(75) Inventors: Matt Calkins, Seattle, WA (US);
Joseph Stephen Beda, III, Seattle, WA (US); Kevin Gallo, Woodinville, WA (US); Gilman K. Wong, Redmond, WA (US); Leonardo Esteban Blanco, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 298 days.

(21) Appl. No.: 10/693,830

(22) Filed: Oct. 24, 2003

(65) Prior Publication Data

US 2004/0233201 A1 Nov. 25, 2004

Related U.S. Application Data

(63) Continuation-in-part of application No. 10/434,718, filed on May 9, 2003.

(51) Int. Cl.
*G06T 15/70* (2006.01)
(52) U.S. Cl. ..................................................... 345/473
(58) Field of Classification Search ................ 345/473, 345/474, 475
See application file for complete search history.

(56) References Cited

U.S. PATENT DOCUMENTS

| 5,261,041 | A | | 11/1993 | Susman ....................... 345/473 |
| 5,416,899 | A | * | 5/1995 | Poggio et al. ............... 345/475 |
| 5,537,641 | A | | 7/1996 | Lobo et al. |
| 5,636,340 | A | | 6/1997 | Bonneau et al. |
| 5,689,618 | A | | 11/1997 | Gasper et al. |
| 5,754,189 | A | * | 5/1998 | Doi et al. ..................... 345/473 |
| 5,764,241 | A | | 6/1998 | Elliott et al. |
| 5,864,342 | A | | 1/1999 | Kajiya et al. |
| 5,867,175 | A | | 2/1999 | Katzenberger et al. |
| 5,877,777 | A | | 3/1999 | Colwell |
| 5,877,778 | A | | 3/1999 | Dow et al. |
| 5,946,002 | A | * | 8/1999 | Lowry ......................... 345/474 |
| 6,057,833 | A | * | 5/2000 | Heidmann et al. ........... 715/726 |
| 6,121,981 | A | | 9/2000 | Trower, II et al. |
| 6,232,988 | B1 | * | 5/2001 | Barlow et al. ............... 345/473 |
| 6,256,048 | B1 | * | 7/2001 | Foster et al. ................. 345/474 |

(Continued)

OTHER PUBLICATIONS

International Search Report in PCT Application No. PCT/US03/15988, dated Oct. 31, 2003, corresponding to U.S. Appl. No. 10/434,718.

*Primary Examiner*—Mark Zimmerman
*Assistant Examiner*—Enrique L. Santiago
(74) *Attorney, Agent, or Firm*—Merchant & Gould

(57) ABSTRACT

A graphical display animation system is disclosed that supports timed modification of element property values of elements within a graphical display. The animation system utilizes a display structure for maintaining a set of elements corresponding to displayed objects within a graphically displayed scene. The elements include a variable property value. The animation system also utilizes a property system that maintains properties associated with elements maintained by the display structure. The properties include dynamic properties that are capable of changing over time—and thus affecting the appearance of the corresponding element on a graphical display. The animation system includes animation classes, from which animation objects are instantiated and associated with an element property at runtime. The animation object instances provide time varying values affecting values assigned to the dynamic properties maintained by the property system.

20 Claims, 5 Drawing Sheets

U.S. PATENT DOCUMENTS

| | | |
|---|---|---|
| 6,266,053 B1 * | 7/2001 | French et al. ............ 715/500.1 |
| 6,326,964 B1 | 12/2001 | Snyder et al. |
| 6,331,861 B1 * | 12/2001 | Gever et al. ................ 345/629 |
| 6,369,821 B2 * | 4/2002 | Merrill et al. .............. 345/473 |
| 6,388,668 B1 | 5/2002 | Elliott |
| 6,404,438 B1 * | 6/2002 | Hatlelid et al. ............. 345/473 |
| 6,414,684 B1 * | 7/2002 | Mochizuki et al. ......... 345/473 |
| 6,433,784 B1 | 8/2002 | Merrick et al. |
| 6,448,971 B1 * | 9/2002 | Seefeldt et al. ............ 345/475 |
| 6,522,333 B1 * | 2/2003 | Hatlelid et al. ............. 345/474 |
| 6,546,397 B1 * | 4/2003 | Rempell ..................... 707/102 |
| 6,563,503 B1 * | 5/2003 | Comair et al. ............. 345/473 |
| 6,600,491 B1 | 7/2003 | Szeliski et al. |
| 6,611,268 B1 | 8/2003 | Szeliski et al. |
| 6,621,431 B2 * | 9/2003 | Engl et al. .................. 341/120 |
| 6,650,339 B1 | 11/2003 | Silva et al. ................. 345/619 |
| 6,768,486 B1 | 7/2004 | Szabo et al. ................ 345/420 |
| 6,937,950 B2 * | 8/2005 | Cragun et al. ................ 702/71 |
| 2003/0076329 A1 | 4/2003 | Beda et al. |
| 2004/0189699 A1 * | 9/2004 | Dobronsky ................. 345/751 |

\* cited by examiner

ANIMATION CLASS

| 400 | Animation Properties<br>From<br>To<br>By<br>KeyValues<br>Interpolation Method<br>KeyTimes<br>KeySplines<br>IsAccumulating<br>IsOverridingBaseValue<br>UsesBaseValue |
|---|---|
| 410 | Timing Properties<br>CurrentTime<br>ParentTimeline<br>Begin<br>Duration<br>Progress<br>RepeatCount<br>CurrentRepeat<br>RepeatDuration<br>Accelleration<br>Deceleration<br>Autoreverse<br>End<br>EndSynch<br>Fill<br>FillDefault<br>Restart<br>RestartDefault<br>Speed<br>IsForwardProgressing<br>IsReversed<br>IsChanging<br>IsPaused |
| 420 | Methods<br>Animation Constructors (See Fig. 5)<br>BeginIn<br>EndIn<br>Pause<br>Resume<br>Seek<br>GetUniqueInstance<br>GetValue |
| 430 | Events<br>Changed<br>Begun<br>Ended<br>Paused<br>Repeated<br>Resumed<br>Reversed<br>Seeked |

FIG. 4

ANIMATION CONSTRUCTOR TYPES

| | |
|---|---|
| 500 | From |
| 510 | To |
| 520 | From-To |
| 530 | By |
| 540 | From-By |

FIG. 5

ANIMATION COLLECTION CLASS

| | |
|---|---|
| 600 | Methods<br>  GetUniqueInstance<br>  GetValue<br>  DefaultParentTimeline |
| 610 | Properties<br>  IsChanging<br>  IsOverridingBaseValue<br>  Animations(array) |
| 620 | Events<br>  Changed |

FIG. 6

DYNAMIC ANIMATION COLLECTION CLASS

| | |
|---|---|
| 700 | Methods<br>  Constructor<br>  Animation Collection<br>  SetDefaultParentTimeLine<br>  GetValue<br>  OnChanged |
| 710 | Properties<br>  OriginalDynamicProperty<br>  Element<br>  IsOveridingBaseValue |

FIG. 7

SYSTEM SUPPORTING ANIMATION OF GRAPHICAL DISPLAY ELEMENTS THROUGH ANIMATION OBJECT INSTANCES

CROSS-REFERENCE TO RELATED PATENT APPLICATIONS

This patent application is a continuation-in-part of copending U.S. patent application Ser. No. 10/434,718, filed May 9, 2003.

FIELD OF THE INVENTION

The present invention relates generally to computing devices. More particularly, the present invention relates to computing system components and sub-systems for maintaining and providing graphical user interface views driven by data and instructional input from an operating system and/or applications.

BACKGROUND OF THE INVENTION

Graphical user interfaces by their nature are highly visual. A typical interactive session involving a user and a graphical user interface includes multiple instances of a user performing an action with regard to a displayed element (e.g., moving a pointer and selecting an icon or control) to invoke an operation and then visually observing the consequences of the operation. One way to draw a user's attention to particular elements on a graphical user interface, to indicate an active or changed status, is through animation of the graphical element. Animation, as used herein, includes changing the appearance or location of a graphical display element (e.g., an icon, a control, a window, etc.) through a sequence of incremental changes applied to the display element over a period of time. However, animation also includes time-based changes to non-visually displayed elements. Thus, animation, as referred to herein, comprises both visual (i.e., changing a visual display parameter value) and non-visual animation (i.e., changing a parameter value over time without affecting a visual display element).

Animation has the potential to enhance the usability and aesthetic appeal of computer systems and applications. User interfaces, and more particularly graphical user interfaces, occupy an important role in computer/user interactions. Animation enhances the computer/user interaction experience by providing an additional type of information or way of conveying the status of a computer program, or component thereof, to the user. For example, rather than causing a selected item to merely disappear or instantly change, animation enables a progression of changes to be displayed that, in combination with an understood context, informs a user what has occurred (e.g., a deleted file floating to a recycle bin). Furthermore, many would agree that animation makes interaction with a computer system more interesting and engages the attention of users more effectively. Furthermore, animation can also automate changes to property values. In particular a user-mode application sets up manual timers and then responding to those timers to change a value.

Animation is likely not incorporated into many user interfaces where such animation would be beneficial to a user. One reason is simply the cost of animating user interface elements. Animation is generally a time-consuming/cumbersome task. Taking a cost/benefit approach to implementing animation in graphical user interfaces, the benefit of incorporating animation should exceed its cost. Due to the current relatively high cost of animation programming, many applications that would benefit from animation are not animated because of its relatively high implementation cost.

One way to reduce the cost of animation is to reuse animation programming for multiple distinct uses. However, animation code is not generally reused. Instead, single (application) use animation code is programmed completely within the applications themselves at development time using programming tools. The animation behavior is defined explicitly within the compiled program code. During runtime, the animation is carried out by merely executing the previously programmed code segment. In addition to being a time-consuming endeavor, incorporating animation into a program potentially results in an unduly large program due to detailed data and instructions utilized to carry out the desired animation behaviors in display elements.

Efforts to enhance the programmability of animation in user interfaces have resulted in the design and provision of non-editable/monolithic animation script sequences from which executable script segments are referenced to provide a desired animation behavior. Such known animation programming methods, based for example upon the Synchronized Multimedia Integration Language (SMIL) standard, incorporate key-framing. The key-framing methods rely upon referencing particular segments of monolithic, non-editable, animation scripts.

The prior known key-framing approach exhibits a relative lack of flexibility with regard to programming new animation behaviors in a graphical user interface. The key-framing script comprises a compiled, non-editable, sequence of animation instructions that morph a display element (or composition of elements) between a designated beginning and end point. The known key-framing animation approach of selecting two points in an animation sequence and then executing the program script between those two points aids programmers seeking to implement animation behavior embodied within the previously created/compiled animation scripts. However, the key-framing approach limits the scope of supported animations to the linear progressions defined by an existing base animation script. The base animation script development is hindered by the need to identify and code all the supported animation behaviors before shipping the animation scripts to users/developers. During the lifetime of the animation script, many instances are likely to arise where a desired animation behavior is not contained in the script. However, the script is not editable by users/developers and therefore cannot be used to execute new desired animation behavior that was not previously encoded in the compiled animation script.

There is therefore a need for a more efficient, flexible, and less costly way of implementing interesting, informative, and meaningful animation behaviors into graphical user interface displays.

SUMMARY OF THE INVENTION

An animation system described, by way of example, and claimed herein below, provides a framework for defining, creating, and executing animation behavior for both graphical user interface display elements and non-visual parameter values. The animation behavior, when applied to an element, causes the value associated with the property to vary over time when the animation behavior is active.

The animation system is incorporated into a system that utilizes a display structure for maintaining a set of elements that correspond to objects displayed within a scene such as a display window of a computer system graphical user interface. The elements include a variable property value affecting a display characteristic of the element. Examples of such a variable property is a position, a dimension, a color, opacity, etc.

The animation system also utilizes a property system. The property system maintains properties associated with the elements maintained by the display structure. The property system supports dynamic properties—ones that are capable of being modified over time.

The animation system also includes animation classes that specify particular animation behaviors executable upon a base value. Animation objects are instantiated from the animation classes. Such animation object instances provide time varying values affecting values assigned to the dynamic properties. Such animation objects are created and attached to properties maintained by the property system under the direction of an application that is driving a display including the elements that vary over the course of time in accordance with associated animation objects.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 4 is an exemplary animation class definition for carrying out animation on a specified element property;

FIG. 5 summarizes a set of exemplary animation constructor types for animating an element property;

FIG. 6 summarizes an exemplary animation collection class for an animation architecture embodying the present invention; and FIG. 7 summarizes an exemplary dynamic animation collection class for an animation architecture embodying the present invention.

DETAILED DESCRIPTION OF THE DRAWINGS

A graphical user interface architecture is described that includes an animation system, a property system, and a display element organization structure. These components, in combination, support property-based animation of graphical user interface display elements—and even non-display values. The disclosed animation architecture includes an animation system including animation classes, interfaces and collections that facilitate creating and tracking animation instances that are attached to a variety of graphical display (and non-display) elements (e.g., icons, dialog boxes, scroll bars, etc.) to achieve desired animation behavior by the elements. Animating the display elements is achieved by changing property values of the display elements. In an embodiment of the invention, changes to a property value are driven by an animation object instantiated from an animation class and attached to the property.

In an embodiment of the invention, graphical animation is achieved by associating an animation collection with a rendering operation on a particular element within an element tree. Once an animated element is initially drawn, the rendering system updates the element's display state at intervals in accordance with an animation behavior defined by components of animation objects instantiated from specified animation classes.

In an embodiment of the invention, animation is designated at multiple levels in a graphical display system having differing refresh cycles. Certain, easily calculated, animations are updated at a relatively high refresh rate. Other, more complicated animations, such as those affecting other graphical display objects, are updated at a relatively low refresh rate.

When taken as a whole, the animation architecture described herein provides a highly flexible platform for executing a variety of new animation behaviors and attach the new behaviors to display elements to create new and highly engaging animated display interfaces.

Figure 1:
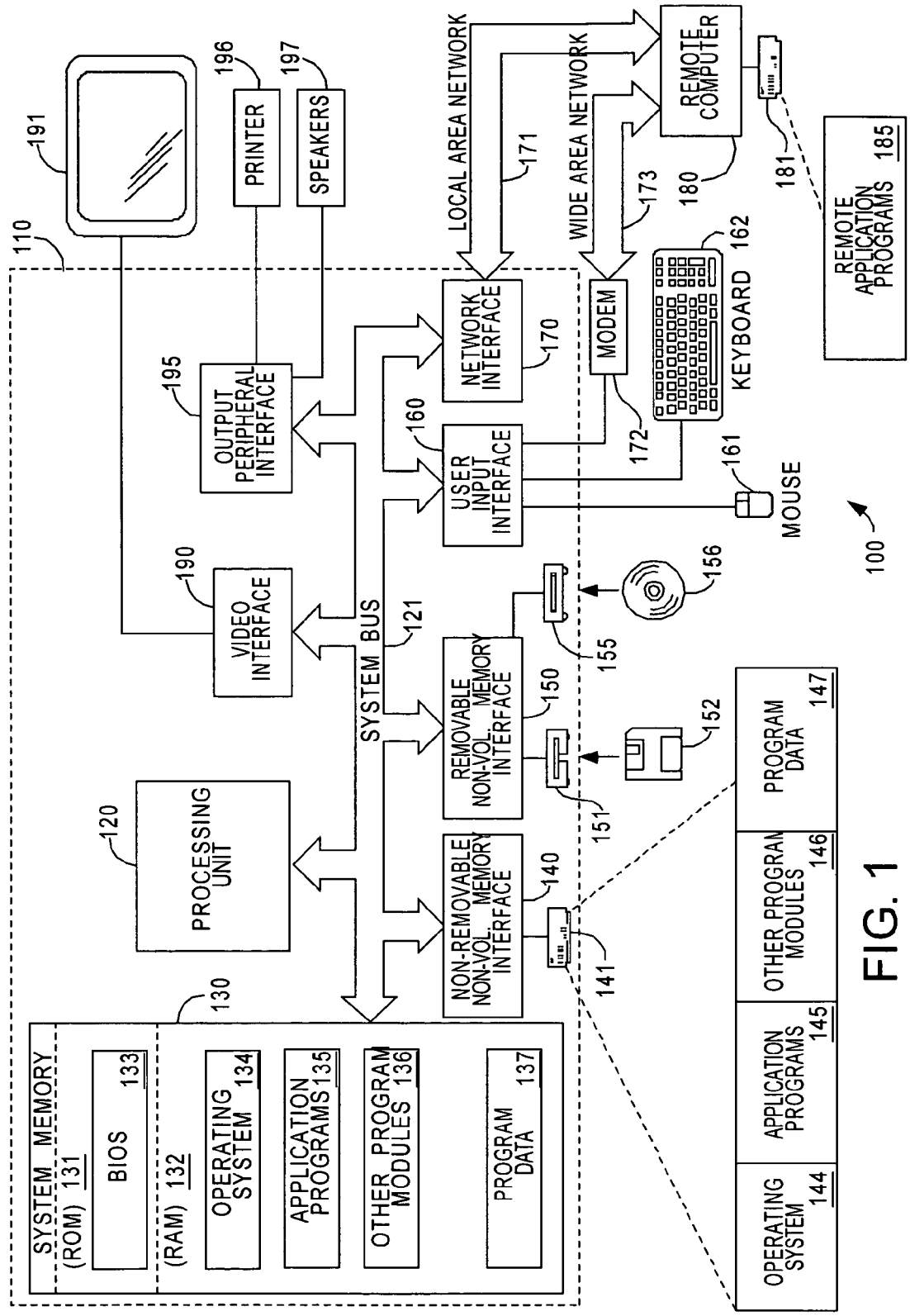
FIG. 1 is a block diagram depicting an exemplary computer system for carrying out an embodiment of the invention.

FIG. 1 illustratively depicts an example of a suitable operating environment 100 for carrying out the animation architecture embodying the present invention. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, laptop/portable computing devices, hand-held computing devices, multiprocessor systems, microprocessor-based systems, network PCs, minicomputers, mainframe computers, distributed computing environments that include any of the above systems or devices, and the like.

The invention is described in the general context of a set of steps and processes carried out by computer-executable instructions, such as program modules, being executed by a computer. Generally, program modules include routines, programs, objects, components, data structures, etc. that perform particular tasks or implement particular abstract data types. Though the exemplary embodiment is described with reference to locally executed processes on a single computer system, the invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is sometimes stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 195.

The computer 110 potentially operates in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory storage device 181. It will be appreciated that the network connections shown are exemplary and other means of establishing a communications link between the computers may be used.

Figure 2:
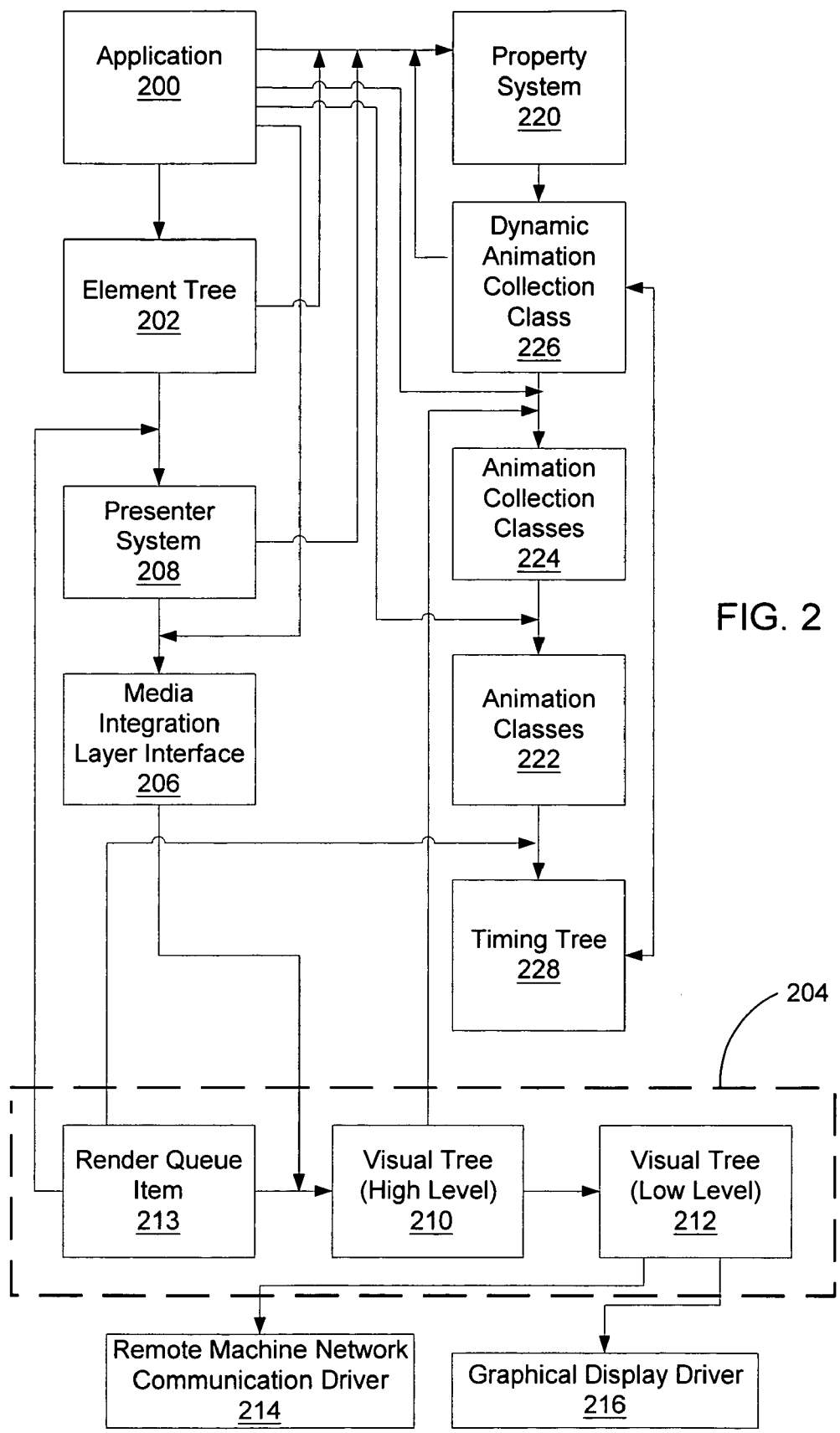
FIG. 2 is an exemplary high level schematic diagram depicting the primary components of a graphics management architecture including an animation system for supporting animation of graphical display elements.

FIG. 2 is a high level schematic diagram identifying components of a graphical display architecture embodying the present invention and incorporating a set of interacting functional components of an animation system. The graphical display architecture depicted in FIG. 2 is divided into a set of functional components to aid the description of an exemplary embodiment of the present invention. The present invention is not limited to the arrangement of the components in the illustratively depicted manner. Rather, the functionality of the components described herein below is grouped differently in alternative embodiments of the invention.

The animation system includes a number of subcomponents that, in combination, facilitate animating graphical display objects (as well as non-visual parameters) based upon high level instructions submitted by an application 200. The application 200 can be any application or control residing either inside or outside the operating system. The animation infrastructure described herein enables delegating, to a substantial extent, programming and executing animation to generalized animation components. In an embodiment of the invention, rather than calculating updated bitmaps, the application 200 submits commands to the animation system specifying/defining animation for one or more display objects.

In accordance with the application 200's commands, the animation system builds animation objects. Animation objects, once instantiated, can be associated with an element tree 202. The element tree 202 is created in response to events generated by the application 200. Examples of such events include the start of the application 200, or some other executed command resulting in the creation of a new view. Thereafter, the application creates new elements, and later removes the elements, in the element tree 202.

The element tree 202 comprises a hierarchically arranged set of elements. In an embodiment of the invention, the element tree 202 structurally defines a document. Each element describes an object that, in most cases, corresponds to a visual image displayable, for example, on a graphical user interface. Examples of elements include: buttons, tables, table cells, list controls, frames, images, and paragraphs (flow panels). Elements in the element tree 202 generally include one or more properties (e.g., color, height, width, position, transparency, etc.). Values assigned to the properties of an element contribute to defining a display state of the element. In an embodiment of the invention, animation objects are assigned to one or more element/property combinations. Thereafter, the animation object instances execute to render an animation behavior on an element's property according to a timeline with which each of the animation object instances is associated.

"Timelines"

Timing and timelines drive the animation system described herein. The timing aspect of the animation system described herein is a derivative of the Synchronized Multimedia Integration Language (SMIL 2.0) W3C specification. Each animation object, once created and before execution, is associated with a timeline (e.g., a time sequence definition) that controls the progression of a sequence of changes associated with the animation object's defined behavior. Furthermore, the above-mentioned timeline only defines a local/relative timing sequence of an animation behavior (e.g., duration of the animation, repeats, accelerations, etc.). An animation object is thus incapable of executing until the animation object has been assigned a "parent" timeline (either directly or indirectly through another object). Therefore, in order to execute the animation object, the relative timeline is attached to a "parent" timing definition ("parent timeline") that ties the relative timing definition of the animation object to an actual execution time defined by a parent timeline. Thus, the parent timeline does not govern the animation behavior of an animation object. Instead, the parent timeline governs the external behavior such as, for example, when the animation actually commences. The timelines are maintained in a hierarchical timing tree structure, and individual timelines have attributes that define their behavior relative to a parent timeline. A top level timeline is defined relative to a root (e.g. document, page, frame, etc.) timeline.

There are a number of ways to associate a parent timeline with an animation object that has its own internal timeline defining its local animation timing behavior. By way of example, a parent timeline is a timing definition to which the animation object is attached. In one exemplary mode of designating a timeline, an entity (e.g., an application) requesting creation of an animation object specifies a parent timeline to which the timeline for the animation object is attached. In this case, the timeline of the animation object identifies the parent timeline at the time of creation, and the created animation object is the actual executed animation object (as opposed to a copy) used by one or more element/property combinations with which the animation object is thereafter associated.

In another exemplary mode of designating a timeline for an animation object, a partially complete animation object class is created that includes its own timeline, but does not include a parent timeline. This incomplete form of animation object definition (lacking a parent timeline) is referred to herein as an "animation template." The animation templates are not executed, instead copies (or clones) of animation templates are created, and the new animation instances are each assigned an animation parent timeline of an element to which the new animation is attached. In such instances, the parent timeline of a cloned animation object is the parent timeline specified by an element to which the cloned animation object is attached. The absence of a specific parent timeline timing definition enables creating multiple clones from a single animation template, and each "cloned" animation object adopts element-specified animation execution (e.g., start, pause, etc.) timing defined by the element to which it is attached. Because the present system supports later designation of a parent timeline, animation objects created for placement onto the element tree 202 do not require explicit designation of a parent timeline at the time of creation. Though such timing information is completed to enable the animation to be executed.

Alternatively, the Application 200 passes animation objects directly to a media integration layer (MIL) 204 via a media integration layer (MIL) interface 206. The MIL 204 is described, by way of example, in Beda et al., U.S. patent application Ser. No. 10/184795, filed on Jun. 27, 2002, entitled "Multiple-Level Graphics Processing System and Method," the contents of which are expressly incorporated herein by reference, including the contents of any references contained therein. In an embodiment of the invention, animation objects passed directly from the application 200 into the MIL interface 206 require explicit designation of a parent timeline, or the animation object is not executed.

The MIL 204 includes a set of graphical display object rendering and control components accessed via the MIL interface 206. The MIL interface 206 is described, by way of example, in Beda et al., U.S. patent application Ser. No. 10/184796, filed on Jun. 27, 2002, entitled "Generic Parameterization for a Scene Graph," the contents of which are expressly incorporated herein by reference, including the contents of any references contained therein. The MIL interface 206 is an interface that the application 200 or a presenter system 208 (described below) rely upon to build up a low-level description of a display frame of an application. The MIL interface 206 includes a set of method calls, such as: DrawLine( . . . ), PushTransform( . . . ), and PopTransform( . . . ). The calls serviced by the MIL interface 206 describe a scene/document/or graphical user interface.

The invention addressed herein provides an infrastructure for defining animation for graphical objects as well as any parameter values that change over time. Thus, the actual animation can be executed by any of a variety of graphics rendering engines, including by way of example, the MIL 204 summarized herein.

The elements maintained by the element tree 202 represent high level graphical items (e.g., buttons, scroll bars, etc). In an embodiment of the invention, such graphical objects are described at high level that is not directly usable by the MIL 204 components. Thus, a presenter within a presenter system 208 compiles/translates constituents of the element tree 202, with which the presenter is associated, into visuals (e.g., lines, filled rectangles, etc.) that make up the elements of the element tree 202. The presenter system 208 passes the visuals into the MIL 204 via the MIL interface 206. There are many ways to carry out the functionality of the presenter system 208. An exemplary embodiment of the presenter system 208 is described in detail in Parikh et al., U.S. patent application Ser. No. 10/434,850, filed on May 9, 2003 (Express Mail EV 329734584 US), and entitled "SYSTEM FOR HOSTING GRAPHICAL LAYOUT/PRESENTATION OBJECTS," the contents of which are expressly incorporated herein by reference, including the contents of any references contained therein.

In a particular embodiment of the invention, the MIL 204 includes a high-level visual tree 210 that is capable of processing the visuals passed by the presenter system 208 into the MIL 204 via the MIL interface 206. The high level visual tree 210 contains a structured set of primitives (e.g., lines, rectangles, images, etc.). The structured set of primitives that describe a single image frame for an application. The high level visual tree 210 supports a class of animations referred to as "independent animations." The independent animations, described further herein below, do not rely upon the presenter system 208 layout function to achieve animation.

A low level visual tree 212 is a potentially flattened version of the high level visual tree 210. The low level visual tree 212 is configured to rapidly render and execute independent animations passed to the low level visual tree 212 via the high level visual tree 210. The low level visual tree 212 potentially executes multiple frames between updates to its structure from, for example, the high level visual tree 210.

The low level visual tree 212 is configured to interface to output drivers. A remote machine network communication driver 214 is an object corresponding to a machine at which the application 200 renders output. The machine is potentially a different machine from a machine upon which the application 200 executes. In such case, the application 200 communicates its visual output over a network connection to display output on a remote machine for a user of the application 200.

Alternatively, the low level visual tree 212 renders output to a graphical display driver 216. The graphical display driver 216 represents the communication of the frame display data to hardware on a local machine that is responsible for drawing the frame to an output display device (e.g., a visual display screen) for a machine currently running the application 200 for a local user.

When objects are being animated, a render queue item 213 ensures that the animations stay in sync with one other. The render queue item 213 is created each time a new frame needs to be rendered—e.g., when changes are made to the element tree 202 or when animation objects cause values to change. The render queue item 213 dies as soon as it is completely processed. The render queue item 213, in carrying out its synchronization role, organizes the following processes: ticking a timing tree 228 (described below) and therefore invalidating dependently animated properties; invoking the presenter system 208 to finalize a layout and update the high level visual tree 210 after the ticking procedure is complete; and after the presenter system 208 finalizes the layout, requesting the visual tree 210 to compile and propagate the changes down to the low level visual tree 212. The steps in carrying out the functions of the render queue item 213 are described herein below with reference to FIG. 3.

Having described certain exemplary function blocks that maintain and generate a frame of data according to provided animated values, attention is now directed to the sources of animated properties within the element tree 202 and their time-driven changes. A property system 220 is responsible for maintaining values for properties. The property system 220 stores and calculates values on elements so that they can be used by the presenter system 208 to create the high level visual tree 210. The property system 220 supports an inheritance model for property values wherein an element's value for a particular property is inherited by a set of children of the element.

As illustratively depicted in FIG. 2, the property system 220 receives input values from many sources. The application 200 sets base values for dynamic properties (and also retrieves their current values) maintained by the property system 220. The element tree 202 requests values, for properties of elements within the element tree 202, from the property system 220 to give to the presenter system 208. The presenter system 208, in turn, uses the property values to generate input to the for calls to the MIL interface 206. During the course of processing the elements of the element tree 202, the presenter system 208 requests dynamic property base values and other information associated with the elements from the property system 220 to organize and assign values to the elements making up a particular view with which the presenter system 208 is associated.

The property system 220 prioritizes values from the different sources. For instance, the property system 220 enables a property value specified locally to take higher precedence over a value specified in a property sheet or a value inherited from a parent. The property system 220 includes logic to sort values provided by various sources and return the highest priority value to any recipient of the value. The property system 220 takes into consideration any active animations attached to a property when calculating the current value for the property. If a user requests a value from a particular source, then the property system 220 handles such request.

Animation objects, that make changes to property values maintained by the property system 220, are instantiated from animation classes 222 that define and execute ways to modify a property value based upon a timeline associated with the animation object instances (or a parent thereof). An animation class object instance is created by the application 200. The application 200 also sets values on the animation objects instantiated from the animation classes 222. The application 200 is also capable of requesting a current value on a particular animation class object. An animation class object is removed when no references exist for the animation class object. The animation classes 222 each have specifiable properties such as From, To, and Duration, that describe a particular animation behavior.

Animation classes are typed so that different classes exist for different animation behaviors and their corresponding data types. Examples of animation classes include:

FloatAnimation—providing a floating point value,

BoxUnitAnimation—providing dimensions for a presenter box,

PointAnimation—providing the top, left position of a rectangle,

ColorAnimation—providing a time-changing color value; and

BoolAnimation—providing a Boolean value.

Instances of the animation classes 220 are immutable. Thus, once they are created, their property values can never be changed. This means an application writer can re-use an animation instance in multiple places without concern that its defined behavior will be changed.

Animation collection classes 224 organize animation classes 222. An animation collection class is created by the application 200. The application 200 specifies one or more animation classes 222 contained within an animation collection class. The application 200 then sets an animation collection class as the collection of animations that will animate a dynamic property in the property system 220. The application 200 can also associate an animation collection class instance with any dynamic property associated with any particular element in the element tree 202. The application 200 is able to enumerate the contained animation classes in a particular animation collection class of the animation collection classes 224, as well as request a composed animation value from the animation collection class. An animation collection class instance is garbage collected when no references exist for the particular animation collection class instance.

An animation collection is a collection of animation objects that process a same data type. An animation collection class is aware of the relative priority of the animation classes in its list and how to compose the animation classes together according to a base value passed into the animation collection class instance, and the animation class returns a current value. In an embodiment of the invention, animation classes are chained together in animation collection classes. The input of the animation collection receives a base property value. The first stage (animation object) renders a modified property value of the same type as the input to a next potential stage (in the case of multiple animation objects within an animation collection class object). The pipelined processing of the base value by the pipelined animation objects of the animation collection renders a current value for the animated property. The result of such pipelining is the creation of a serially executed composite animation function.

An animation collection class exists for each type of property value for which animation is supported (e.g., FloatAnimationCollection, BoxUnitAnimationCollection, PointAnimationCollection, ColorAnimationCollection, and BoolAnimationCollection). This list of animation collection class types is merely exemplary. Those skilled in the art will readily appreciate the potential wide breadth of different animation collection class types. As with animation classes 220, instances of an animation collection class from the animation collection classes 224 are immutable.

A dynamic animation collection class 226 builds upon the functionality of, the animation collection classes 224. An instance of the dynamic animation collection class 226 holds onto a reference to an animation collection class instance of the animation collection classes 224. In addition, a dynamic animation collection object instance holds onto a reference to an element within the element tree 202 and to a property on the element that the dynamic animation collection instance is animating. An application writer, in an embodiment of the invention, cannot create or access a dynamic animation collection instance. Instead, the property system 220 creates a dynamic animation collection instance upon receiving a request from the application 220.

A dynamic animation collection object instance is created by the property system 220 when an animation collection class instance is associated with a dynamic property. The dynamic property holds and/or calculates a value associated with a single defining property for an element in the element tree 202, such as width, height, top, left, or any other defining property of any kind of element. The dynamic animation collection also holds an animation collection instantiated from an animation class of the animation collection classes 224 and thus associates the animation collection class with a particular element/property combination in the element tree 202. If the property system 220 is asked for a current value of a dynamic property, the property system 220 determines whether the dynamic property has an associated dynamic animation collection object instantiated from the dynamic animation collection class 226, and the property system 220 processes the base value through any currently active animation classes in the dynamic animation collection to provide a current animated value. In an embodiment of the invention, when the property system 220 requests a particular dynamic animation collection object for a current value, the specified dynamic animation collection passes the request onto an appropriate animation collection object instantiated from one of the animation collection classes 224. The animation collection object, in turn, loops through its set of animation objects instantiated from the animation classes 222 to render their current values to provide the basis for rendering a final value by the animation collection object to its calling dynamic animation collection.

Some animations created by the application 200 may not specify a parent timeline and expect the animation system to choose the appropriate parent timeline for a requested animation. During the association process, the property system 220 initially determines whether each animation class within the animation collection class has a parent timeline. If any animation class is not associated with a parent timeline, then a new animation class is created that is associated with a parent timeline of a display element with which the dynamic animation collection is associated. Furthermore, it is noted that if the parent timeline associated with a display element is changed, then the dynamic animation collection is rebuilt to reflect the change in the parent timeline.

To properly function, all animation classes within an animation collection class must eventually specify a parent timeline that governs the timing of their execution. If all of the animation classes in the specified animation collection class are associated with parent timelines, then the dynamic animation collection uses the specified animation collection class. Otherwise, in view of the immutability of animation classes and animation collection classes, the property system 220 creates a new animation collection class, and the new animation collection class includes new animation classes, each having an assigned parent timeline. Once the property system 220 has created the new animation collection class with each animation object having a parent timeline, the property system 220 gives the animation collection class to the dynamic animation collection associated with the element/dynamic property pair. If there is not yet a dynamic animation collection associated with this pair, the property system will create a new one. 226.

As noted many times above, timing drives the animation behaviors associated with the animation objects attached to properties of elements in the element tree 202. As used herein, a timeline is an instance of a timing entity that maintains a runtime state according to a set of timing attributes. The timing tree 228, in an embodiment of the invention, is a data structure containing timing nodes (timelines) arranged in a hierarchical manner. The relationship between timing nodes is defined by inheritance rules and by the node-specific timing attributes of each timeline corresponding to a timing node in the timing tree 228. The inheritance rules include defining offsets of children begin times relevant to parent begin time. Furthermore, the inheritance relationships specify control relationships. For example, if a parent is restarted, repeated, paused, resumed, seeked or ends, so to do all the children (and their children, etc.). Such relationships enable starting a whole group of child timelines through an action on a single parent timeline. The timing tree 228 holds onto: (1) timelines that potentially drive changes to values of animation class instances, and (2) container timelines which contain other timelines. Progress values derived from the timelines are used to calculate any given animation object's current value. The timing tree 228 is created at startup time of the application 200.

The timing tree 228 carries out a timing event notification role for the animation infrastructure depicted in FIG. 2. Initially, when a dynamic animation collection is instantiated, a request is issued by the dynamic animation collection to the timing tree 228 to issue a notification whenever an animation instance in its animation collection class object has progressed. When the dynamic animation collection receives a notification from the timing tree 228 that one of it's animations has progressed, the dynamic animation collection instance notifies the property system 220 that the dynamic property on the display element, with which it is associated, is now invalid. The invalidation of a display element property in-turn begins a process referred to herein as dependent animation. During dependent animation processing, the presenter system 208 is requested to build the high level visual tree 210 in accordance with the value change associated with the animation.

The timing tree 228 also performs a progress measurement and reporting role for instances of the animation classes 222. In response to invalidation, instances of the animation classes 222 are requested to report their current values. The animation classes 222 query the timing tree 228 for a timeline progress value with which each is associated. The animation classes 222 thereafter calculate their current values based upon a progress value supplied by the timing tree, and provide the current values to any requesting entity.

The render queue item 213 also interacts with the timing tree 228. The render queue item is a queue item in the operating system queue which, when executed, causes the application/page/scene generated by the application 200 to be compiled down to the low level visual tree 212 and eventually be rendered onto the display device. The first thing the render queue item performs, once invoked, is "tick" the timing tree 228. This has the effect of having the timing tree update its timelines to the current time. As a result, the timing tree 228 sends out notifications which may cause many invalidations in the property system 220. Progress values of independent animations are updated as well when the tick is executed. If, during the processing of the render queue item 213, the timing tree 228 is modified, the render queue item will loop and "re-tick" at the same time until the timing tree 228 stabilizes.

Independent/Dependent Animations

Both independent and dependent animations have been mentioned above. In an embodiment of the invention, the animation system depicted in FIG. 2 supports at least these two types of animation instances—whose classification is based upon their relationships to other animation instances. Independent animation instances do not impact the layout of a view and can therefore be refreshed at a higher rate. An example of an independent animation is a color animation. The color of an object does not modify its width or height, and therefore the color-change animation does not affect how the color-change animated element is laid out (e.g., size or position) on the page.

Dependent animations generally change a layout of an element with which the dependent animations are associated, and therefore dependent animations require recalculation of a graphic user interface layout. The dependent animation instances are stored within the element tree 202 structure to ensure proper processing of all affected display element properties. Due to potentially significantly greater calculation and memory access requirements, dependent animations are calculated at a potentially lower refresh rate by the MIL 204.

Three Levels/Stages for "Animation" Classes

In an embodiment of the present invention, the animation behavior applied to display element properties is implemented through three levels of classes, and their corresponding instances. With continued reference to FIG. 2, the animation classes 222 comprise a set of object classes defining objects capable of computing particular defined animation operations on a property value (typically a single animation behavior).

At the next level, the animation collection classes 224 define a set of objects that group/assign one or more individual animation classes from the animation classes 222 into a single animation class definition—thereby supporting creation of composite animation behaviors on a single element property.

At the next level, the dynamic animation collection 226 defines an object type to carry out/execute an animation behavior, defined by one of the animation collection classes 224, on a property of an element within the element tree 202. Such functionality is facilitated by instances of the dynamic animation collection 226 holding onto: a reference to an animation collection class instance of the animation collection classes 224; and a reference to an element within the element tree 202 and to a property on the element that the dynamic animation collection instance is animating. A dynamic animation collection is created by the property system 220 when an animation collection class instance is associated with a dynamic property. The dynamic property holds and/or calculates a value associated with a single defining property for an element in the element tree 202, such as width, height, top, left, or any other defining property of any kind of element. The dynamic animation collection also holds a reference to an animation collection class object instantiated from one of the animation collection classes 224 and thus associates the animation collection class object with a particular element/property combination in the element tree 202.

Figure 3:
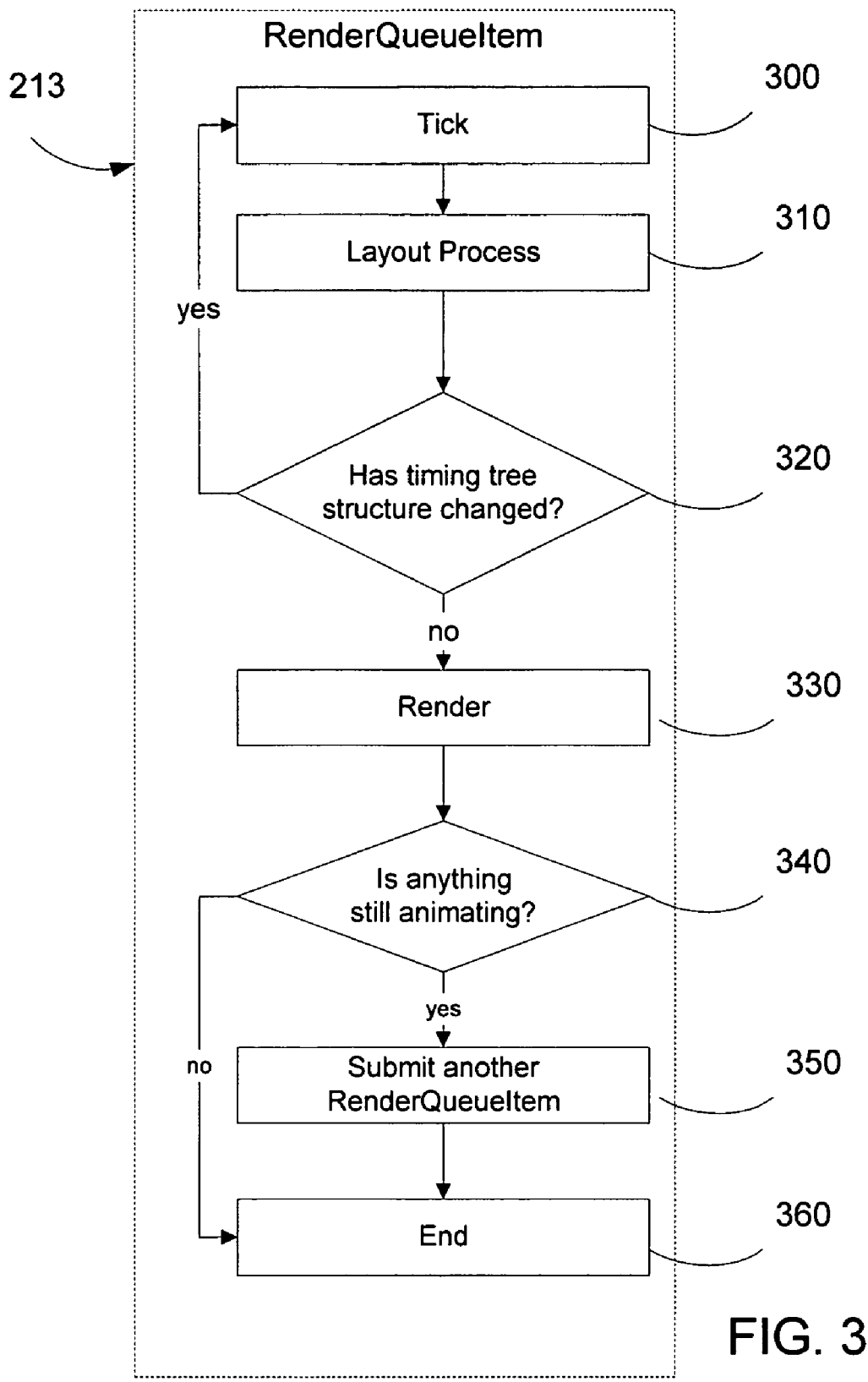
FIG. 3 is a flowchart summarizing an exemplary sequence of repeated steps performed in a system embodying the present invention to maintain/render an animated graphical user interface.

Turning to FIG. 3, a set of steps are summarized for an exemplary rendering sequence performed by the render queue item 213 of FIG. 2. As explained above, the render queue item 213, when executed, causes the application/page/ scene generated by the application 200 to be compiled down to the low level visual tree 212 for rendering by a display device. It is noted that this sequence of steps is exemplary, and the render queue item operation is modified in other embodiments of the invention.

Initially, during step 300, the render queue item 213 causes a ticking of the timing tree 228. Ticking the timing tree 228 has the effect of having the timing tree 228 update its timelines to the current time. As a result, the timing tree 228 sends out notifications which may cause many invalidations (e.g., invalidating dependently animated properties) in the property system 220. In an embodiment of the invention, a Changed event is raised by animation objects that have been affected by the updated time. These events are collected and processed by an animation object's associated Dynamic Animation Collection object instance. The Dynamic Animation Collection object, in turn, invalidates its dynamic property on an element. Progress values of independent animations are updated as well when the tick is executed at step 300.

After ticking the timing tree 228, during step 310 a layout process is performed by the render queue item 213. During the layout process 310 the high level visual tree 210 is updated according to any changes to the element tree 202 since the last execution of a render queue item. In an embodiment of the invention, presenters that are responsible for laying out graphical elements in a view that have changed property values (as a result of the ticking of the time), are invalidated—meaning they must recalculate their layout and create a new high level visual tree incorporating the changes to the affected dynamic properties. Also during step 310, the display system receives and dispatches requests from applications, the operating system shell, etc. that potentially affect the layout. Examples of such requests include hit tests, callbacks to user programs, and general application actions affecting the graphical display.

During the layout process 310, the timing tree 228 structure can potentially change (e.g., a new timing node was added, an existing node was removed, a new reference was established to an existing timing node, etc.). If, at step 320 it is determined that the timing tree structure changed, then control passes back to step 300 and the timing tick is re-executed on the timing tree 228 structure in its new form.

If the timing tree 228 has not changed in structure, then control passes from step 320 to a Render step 330 wherein the high level visual tree 210 compiles and propagates new/updated graphical display data to the low level visual tree 212. The low level visual tree 212, based upon the received changes, renders recalculated output to the drivers 262 and/or 264.

Thereafter, during step 340, the timelines associated with the dynamic animation collection are queried to determine a next time that it needs to be ticked (nearest event). If no further ticks are needed, then control passes to the End 360. If additional ticks of the tree are needed, then control passes to step 350 wherein a new instance of the render queue item 213 is created for the animated element property's dynamic animation collection instance. The new render queue item specifies a time at which it should be executed. If the specified time of execution is some time that has not yet been reached, then the render queue item is initially placed in an inactive list. When the time is reached, the render queue item is placed within an active queue for execution in accordance with the steps set forth in FIG. 3. After created the new render queue item, control then passes to the End 360.

Animation behavior for an element property, is carried out by one or more animation objects instantiated from the animation classes 222. Each animation object includes an animation function that takes a first set of inputs (including at least a current timeline value) and produces an output of a type suitable for rendering an animated display element. Various ones of the animation classes 222 (e.g., PointAnimation) convert a timeline progress value into an appropriate data type (e.g., a point) for an element property.

Turning to FIG. 4, an exemplary high-level animation class structure is summarized. The various animation classes follow a common pattern and implement a similar set of interfaces. The differences arise primarily in the data types of properties, and in the calculations performed (in view of the particular data type such as: floating point, Boolean, point, etc.) to assign a current value to an input value in view of a calculated progress value. Such modifications are well within the skill of those skilled in the art in view of the examples and description of the functionality of animation classes contained herein.

In an embodiment of the invention, the animation class structure includes a set of Animation Properties 400. A From property designates a starting animation value. A To property specifies an ending animation value. A By property specifies a change (delta) value at the end of an animation. Rather than specifying an explicit end value in the To property, the By property specifies a difference between an ending animation value and an initial animation value.

An animation class can comprise multiple segments utilizing different timing parameters within each segment. A KeyValues property specifies a list of values for an animation. An interpolation method property specifies a method for interpolating between two key values specified in the KeyValues property. Examples of interpolation methods include: discrete, linear, paces, and spline. A KeyTimes property designates a list of time values used to control the pacing of the animation. This list contains the same number of elements as the KeyValues list. The list is ordered in increasing time values, and the first value in this list is 0 and the last 1 (unless InterpolationMethod is set to Discrete, in which case the last value may be anything less than or equal to 1). A KeySplines property specifies a set of Bezier control points associated with a KeyTimes list. The Bezier control points define a cubic function that controls the interval pacing of the animation. This list contains one less element than the KeyTimes list. This list is only used if the InterpolationMethod attribute is set to Spline.

The animation properties within an animation class structure include certain Boolean attributes. An IsOverridingBaseValue property is set to True if the timeline of the animation object is active or in a fill period. Furthermore, an IsAccumulating property enables a repeated animation sequence to have a cumulative effect upon an element's property. When the IsAccumulating property is set to True, rather than repeating the same trajectory on every iteration of a repeated animation sequence, an animation accumulates the effect of each iteration, in essence composing with itself and building upon a previous animation-induced change to an element's property.

A UsesBaseValue property returns True if the return value of GetValue for the animation object (described below in association with a set of methods 420) depends on the base value (provided to the animation object). If the UsesBaseValue property returns False, then the animation object ignores the base value altogether. If the animation object is in a list, the UsesBaseValue property allows an optimization where only a subset of the animation objects need to be evaluated in some cases.

The animation class structure also includes a set of timing properties 410. A CurrentTime property provides a current time local to the timeline for the animation object. A ParentTimeline property designates a timeline that is the timing parent of the animation object's timeline. The ParentTimeLine property can reference any other timeline, or one of two special reference values: Timeline.VisualParent or Timeline.RootTimeline. If the ParentTimeline property is set to Timeline.VisualParent then the timeline is auto-parented on use to the timeline associated with the visual in which it is used. If the visual does not have an associated DefaultTimeline, then the parent visual is inspected, recursively. If the ParentTimeline property is set to Timeline.RootTimeline then this timeline is auto-parented on use to the "root" of the timing tree 228.

The set of timing properties also includes a Begin property for designating a time at which the timeline for the particular animation object should begin. By default the begin time value is relative to a parent timeline's begin time, but a offset is also potentially specified providing a time relative to some other timeline's begin or end time. In the latter case, the other timeline must be parented to the same timeline as the timeline for this particular animation object. A Duration property on an animation object designates a duration of a single period from beginning to end. A Progress property designates the current progress value of the timeline. If IsOverridingBaseValue (described herein below) is false, then the Progress property returns 0. In all cases, the return value of the Progress property is always a value between 0 and 1, inclusive.

In an embodiment of the invention, repeating an animation is supported. A RepeatCount property specifies a number of times a begin to end period should be repeated during the life of this animation object. The RepeatCount property value is potentially a fractional value. A special value, float.PositiveInfinity, indicates that the timeline should repeat continuously. A CurrentRepeat property specifies a current iteration of the timeline, if it repeats. The first iteration is iteration 1. If the IsOverridingBaseValue animation property is false the CurrentRepeat property returns 0.

A RepeatDuration property specifies a length of time for which a begin to end period should be repeated. This potentially results in a fractional execution (repeat count). The RepeatDuration property value of Time.Indefinite indicates that the timeline should repeat forever. If the IsOverridingBaseValue property is false this property returns Time.Unspecified. If values are specified for both the RepeatCount property and the RepeatDuration property, then the total active duration is the minimum of the two specified properties.

The timing properties for the animation classes also include an acceleration property that designates a value, between 0 and 1, representing a fraction of the simple duration spent in the time acceleration phase. A deceleration property designates a value, between 0 and 1, representing a fraction of the simple duration spent in the time deceleration phase. Since the animation cannot simultaneously accelerate and decelerate, the sum of the acceleration and deceleration property values does not exceed 1 (the simple duration).

An Autoreverse property designates whether the animation is to progress from beginning to end and then back. If the Autoreverse property has a value of "True", then the timeline progresses from beginning to end and then immediately progresses backwards from end to beginning. The timeline will be active for twice the amount of time specified by the Duration property of the animation object.

An End property maintains a value specifying a maximum end time for the timeline for the animation object. If the End property value is less than the sum of the Begin and Duration property values, then the activation period is cut short by the End property value. In addition, all specified animation beginnings (scheduled or interactive) past the time specified by the End attribute are ignored.

An EndSync property value defines an implicit duration of a timeline. The implicit duration specified by the EndSync property is used if the Duration property is not set explicitly. The implicit duration of a timeline can be defined by the timed object that it controls or by other timelines that may be parented to it.

A Fill property specifies a behavior of the timeline of the animation object after the end time passes. By default, the timeline is only "on" from begin to end, but if the Fill property is set to "Freeze", then the timeline remains on past the end time. In that case, the progress value for the animation object after the end time is equal to whatever it was at the end time. Settings for the Fill property value are Remove (the global default), Freeze, and Hold. A FillDefault property designates a default value for the Fill property. If the Fill property value is not specified, then the value of the DefaultFill property specifies the fill behavior. In addition, this default is inherited by timelines parented to this one, unless they have their own FillDefault attribute set. The possible values for the DefaultFill property are the same as for the Fill attribute.

A Restart property designates a behavior of the animation object's timeline when a second (or later) begin time is reached. By default, a begin time interrupts any active period and goes back to time t=0 for the timeline. However, if the Restart property is set to WhenNotActive, then a begin time that would interrupt an active period is ignored. The possible values for the Restart property are: Always, WhenNotActive and Never. A RestartDefault property designates a default value for the Restart property.

A Speed property designates a relative speed at which time should pass for the timeline for the animation object (compared to its parent timeline). E.g., A value of 1 means normal speed, whereas a value of 2 means that time elapses twice as fast (and, therefore, the perceived duration ends up being only half that specified by the Duration attribute). This value may be negative, in which case time flows backwards in this timeline, from end to begin times, as if the parent timeline was reversed.

A set of Boolean properties are included to identify the state of the animation object's animation. An IsForwardProgressing property identifies whether progress in this timeline moves from 0 to 1 in relation to wall-clock time. The IsForwardProgressing property takes into account the effect of being nested in potentially reversed timelines. If IsOverridingBaseValue is false, then IsForwardProgressing returns the same value as that which this timeline's parent timeline would return. An IsReversed property identifies whether the timeline is in a reversed period, as seen from the timeline's own local frame of reference. This property, in contrast to the IsForwardProgressing property, does not take into account the effect of being nested in potentially reversed timelines. If the IsOverridingBaseValue property value is false, then the Is Reversed property returns false.

Other properties relate to the state of the animation's state of activity. An IsChanging property identifies whether the timeline of the animation object is active. In contrast, an IsPaused property returns true if the timeline is active, but the animation is paused.

The animation class also includes a set of methods 420. A set of constructor methods, within a particular animation class, create animation objects incorporating particular animation behaviors of a specific animation class type (e.g., float, Boolean, point, etc.). A set of animation constructor method types, corresponding to particular animation behaviors, are identified, by way of example, in FIG. 5 described herein below.

A BeginIn method receives as input an offset time value. The BeginIn method triggers an interactive begin at a point in time in the future or past corresponding to the offset value. The input offset parameter specifies a time in reference to the animation object's parent timeline. If the parent timeline is not active, this method has no effect.

Similarly, an EndIn method receives as input another relative time value. The EndIn method triggers an interactive end at the specified point in time in the future or past. The parameter is in the frame of reference of the animation object's parent timeline. If the parent timeline is not active, this method has no effect.

Methods are provided to stop/start the progression of the animation object while it is active. A pause method pauses the animation object's timeline and children that reference the animation object's timeline. If this timeline is not active this method has no effect. Conversely, a resume method restarts the animation object's timeline and all of its children timelines. If this timeline is not active and paused this method has no effect.

A seek method enables moving directly to a particular point in an animation execution sequence based upon a specified offset value. The seek method changes the current time for this timeline—that potentially affects all of its children timelines. If the timeline is not active this method has no effect.

A GetUniqueInstance method receives a timeline as input, and returns an instance of an animation object that can maintain its own run-time state separately from other instances. If the animation object contains auto-parented timelines, the returned instance has those timelines parented to the timeline passed in as a parameter.

A GetValue method takes as an input a base value, of a certain type, and returns another value of the same type as the input base value. The value of the output depends both on the input (base value) and on the internal state of the modifier (e.g., animation object/collection) to which it is passed. In particular, this means that calling GetValue more than once with the same input is not guaranteed to return the same output, and in fact it is expected to change during the course of an animation sequence. In the case of the animation object classes 222, the GetValue method receives a passed base value and returns a value based upon its internal modifier definition computation of a progress value.

Finally, the animation class structure supports a set of events. A Changed event 430 is raised whenever the animation object's internal state changes. The Changed event 430 flag is used to indicate that re-rendering is needed (something has changed in position or dimension). A Begun event signal is raised when an object enters a period in which its internal state is continually changing. An Ended event signal is raised whenever the object leaves a period when its internal state is continually changing. A Repeated event is raised whenever the animation object's timeline repeats its simple duration. A Reversed event is raised whenever the direction of time changes on the animation object's timeline.

The events Paused, Resumed, and Seeked are raised in response to completing a corresponding Pause, Resume and Seek method on the animation object's timeline.

Turning to FIG. 5, a set of animation object behaviors are identified. Each of the identified behaviors corresponds to a particular constructor class supported, where appropriate, by each of the animation class types listed previous herein above. A From constructor type 500 creates an animation object that takes as its initial value a passed "From" value and progresses to a base value specified on the associated property. A To constructor type 510 creates an animation object that takes as its initial value the base value specified on the associated property and progressed to a passed "To" value. A From-To constructor type 520 receives passed parameters designating the From and To property values for the animation object—the base value on the animated element's property is not used during the animation. However, when the animation sequence ends the element property reverts to the base value unless the Fill timing property on the animation object is "Freeze."

Rather than specifying endpoints for an animation, an animation value range can be specified through an end point and an amount of change (delta) value. A By constructor 530 receives a delta value, starts an animation at a base value, and proceeds to change the base value by the amount specified by the delta value during the course of the animation cycle. A From-by constructor 540 receives as its input a starting "From" value and proceeds to change the initial "From" value by a passed delta value during the animation cycle. Having described a basic set of constructors for animation objects, it is noted that the present invention contemplates a wide variety of animation behaviors (and corresponding constructors)—including composites/combinations of the aforementioned behaviors.

Having described an exemplary animation class structure, attention is now directed to the container of the animation objects, the animation collection classes 224. Turning to FIG. 6, an exemplary structure for an animation collection class is depicted. Animation collection objects maintain a list of animation objects instantiated from animation classes 224. Turning first to a set of methods 600 supported by the animation collection classes, a GetUniqueInstance method returns an animation collection instance with a default parent timeline corresponding to a passed timeline identification. The animation collection class also supports an interface for setting a DefaultParentTimeline property on an animation collection class. In an exemplary embodiment of the invention, the property system 220 calls the GetUniqueInstance method to obtain a copy of a particular animation collection for a dynamic animation collection object. The animation collection object contains a list of animation objects. A builder function/entity adds animation objects to the created animation collection instance. The animation objects within the animation collection are indexed and referenced/accessed by specifying a particular position within the list (as in an array).

A GetValue method takes as an input a base value, of a certain type, and returns another value of the same type as the input base value. The value of the output depends both on the input (base value) and on the internal state of the modifier (e.g., animation object/collection) to which it is passed. In particular, this means that calling GetValue more than once with the same input is not guaranteed to return the same output, and in fact it is expected to change during the course of an animation sequence. In the case of the animation collection class, the GetValue method provides a passed base value to the first animation object in its collection. The output of the first animation object becomes the input base value to a next animation object (if present) in the animation collection. This process repeats until the last animation object in the animation collection has computed an output. The GetValue method returns the output value provided by the last animation object within the pipeline of animation objects within the animation collection.

The animation collection class also includes a set of properties 610. An IsChanging property and IsOverridingBaseValue property are similar to the correspondingly named properties on animation objects. However, in the case of an animation collection class, the properties are merged such that if any one of the animation object's corresponding properties returns "True," then the corresponding property on the animation collection returns "True." The Animations (array) property maintains a list of the animation objects within the animation collection.

The animation collection also supports a set of events 620. The Changed events coalesce and report the corresponding events, described herein above, fired from the constituent animation objects of the animation collection.

Turning now to FIG. 7, a set of methods and properties are identified for the dynamic animation collection class 226. The set of methods 700 includes a dynamic animation collection constructor method. The dynamic animation collection constructor method receives as input, an element reference (on the element tree 202), a dynamic property on the element, and an animation collection instance, the constructor returns a dynamic animation collection object that operates as an interface between the timeline induced changes to animation objects within the passed animation collection object, and the dynamic property on the element contained in the element tree 202.

An interface on the dynamic animation collection object supports setting/getting the animation collection object with which the dynamic animation collection object is associated. A SetDefaultParentTimeline method repairs timeline connections in the event that the element, to which the dynamic animation collection object is attached, is relocated in the element tree 202 or the timing for the element is otherwise changed.

A GetValue method returns the current value for the element's animated property (provided by the animation collection to which the dynamic animation collection is attached).

An OnChanged method is called when the progress of any animation object within the animation collection has changed. When invoked, the OnChanged method causes an invalidation of the dynamic property. This in-turn invokes the re-rendering of affected elements.

Turning to the properties 710, an OriginalDynamicProperty property returns a reference to the dynamic property with which the dynamic animation collection is associated. An Element property returns the element with which the dynamic animation collection is associated. The IsOverridingBaseValue returns a value based upon a call to the correspondingly named property on the animation collection with which it is associated.

Having described an animation architecture, using the described architecture to animate properties on elements by giving them time-varying values is described by way of example. In general, every animated resource, method or object includes an interface enabling notification of the entity's animation capabilities, its default parent timeline, whether it has changed, a current value of the object, and whether the entity is changing. By way of particular example, the interface of an animatable entity includes a DoesChange property that returns True if the object may vary with time. In general, the DoesChange property is true if the object is holding any animation collections. A DefaultParentTimeline property returns a reference to a timeline that is the parent of any auto-parented timelines. If the DefaultParentTimeline property is set, then any auto-parented timelines are re-parented, but a new clone is not created either for the timelines or for this animatable object. An IsChanging property returns True if any of the animations in an animatable object are changing. An IsOverridingBaseValue property returns True if any timeline of the animatable object is active or in a fill period. A Changed event is raised whenever the animatable entity's value changes.

In addition, the animatable entity includes a CurrentValue method that returns an object that is used as the value of the property. The value is the instantaneous value of the object, but it does not change once it is set. A GetUniqueInstance method, specifying a particular timeline, returns an object that can be used as the value of a property. If the object refers to any auto-parented timelines, the instance returned has those timelines parented to the specified default parent timeline.

An animatable entity also specifies for every animatable property, a corresponding reference to an animation collection type to facilitate creation of a dynamic animation collection by the property system. In an embodiment of the invention, animation collections are used rather than basic animation objects since such usage would preclude animation composition.

Resources are animated by adding animation collections to individual properties. The following example shows how to create a SolidColorBrush with an animate color.

```
ColorAnimationBuilder animBuilder = new
    ColorAnimationBuilder( );
        animBuilder.From = new Color(1.0f, 0.0f, 0.0f, 0.0f);
        animBuilder.Begin = new Time(0);
        animBuilder.To = new Color(1.0f, 1.0f, 0.0f, 0.0f);
        animBuilder.Duration = new Time(1000);
        animBuilder.AutoReverse = true;
        animBudtlder.RepeatDuration = Time, Indefinite;
        SolidColorBrushBuilder brushBuilder = new
    SolidColorBrushBuilder( );
        brushBuilder.Color = new Color (1.0f, 0.0f, 0.0f, 0.0f);
        brushBuilder.ColorAnimations =
    animBuilder.ToColorAnimation( );
        SolidColorBrush animateBrush = brushBuilder.ToBrush( );
```

Animate resources can be used in rendering operations or as values for element properties. A rendering operation is animated, by way of example, by adding animation collections to drawing context method calls, or by using animate resources. The following example shows how to push an animated opacity value into a drawing context.

```
FloatAnimationBuilder animBuilder = new
    FloatAnimationBuilder( );
        animBuilder.From = 0.0f;
        animBuilder.Begin = Time.Immediately;
        animBuilder.To = 1.0f;
        animBuilder.Duration = new Time(1000);
        animBuilder.Fill = TimeFill.Freeze;
        myDrawingContext.PushOpacity(0.0f,
    animBuilder.ToFloatAnimation( ));
```

Elements can be animated by adding animation collections to Element properties. The following example shows how to animate the width of a button in C sharp.

```
BoxUnitAnimationBuilder animBuilder = new BoxUnitAnimationBuilder( );
    animBuilder.From = new BoxUnit(50);
    animBuilder.Begin = Time.Immediately;
    animBuilder.To = new BoxUnit(100);
    animBuilder.Duration = new Time(1000);
    animBuilder.Acceleration = 0.2;
    animBuilder.Deceleration = 0.2;
    animBuilder.Fill = TimeFill.Freeze;
    myButton.Width = new BoxUnit(50);
    myButton.WidthAnimations =
aninBuilder.ToBoxUnitAnimation( );
```

The following shows the same example in XAML

```
<Button ID="myButton" Width="50">
    <Button.Width>
        <BoxUnitAnimation
            From="50";
            Begin="Immediately"
            To="100"
            Duration="1"
            Acceleration="0.2"
            Deceleration="0.2"
            Fill="Freeze"
        />
    </Button.Width>
</Button>
```

Whenever an animation (or an animated resource) is used, the animation (or resource) is cloned to provide the destination with a unique, independently controllable timeline. A consequence of this particular way of implementing animation on a property is that the original animation is never part of a visual scene, and therefore it doesn't respond to control calls through an animation object's timing interface. To achieve this effect, the calling code must first use an animation and then read the animation back. The value that is read back can then be cached and used for timing control. The following example shows a pattern that code intending to control animations follows:

```
private FloatAnimation myOpacityAnimation;
public void Initialize( )
{
    FloatAnimationBuilder animBuilder = new FloatAnimationBuilder( );
    // Set the Begin property to Indefinite because we want to start
    // this animation interactively, not automatically.
    animBuilder.Begin = Time.Indefinitely;
    animBuilder.From = 1.0f; // Fully opaque
    animBuilder.Duration = new Time(500); // half a second
    animBuilder.To = 0.5f; // Half transparent
    animBuilder.AutoReverse = true;
    // Create the animation
    FloatAnimation animation =
animBuilder.ToFloatAnimation( );
    // Animate the opacity of some element we own
    myElement.Opacity = 1.0f;
    myElement.OpacityAnimations = animation;
    // ERROR: The following line doesn't have the intended result:
    // myOpacityAnimation = animation;
    //
    // This line caches an animation "template", not the actual animation
    // that controls the opacity of the element.
    // This caches the right animation pigment - the one that is actually in use:
    myOpacityAnimation =
(FloatAnimation) myElement.OpacityAnimations[0];
}
public void OnSomeEvent( )
{
    // Whenever we detect some event, "blink" the element
    myOpacityAnimation.BeginIn(0);
}
```

The animation system disclosed herein is intended to support a variety of animation types—wherein each type is generally distinguished by the type of data (single or composite) that is manipulates. By way of example, examples of animation data/types include: integer, decimal, character, color, double precision floating point, floating point, length (for properties that accept a length value such as height or width of a box), path (used to move a visual object along a path), point (for properties that accept an x,y coordinate pair value), rectangle (for properties that accept a rectangle value defined by height/width/top-left corner), size (non-negative width and height combination), and vector (directed line defined by x,y coordinate pairs). The above are merely examples of the many different types of animations that are supportable by the above-described animation system.

The description that follows comprises a specific example of a class definition for animation referred to above as double precision floating point animation. The other animation classes, for carrying out the other animation types described above, generally track the double precision floating point animation class definition and therefore are not included.

A double animation class, described by a table provided below, corresponds to animation classes 222 (described above), in the animation framework depicted in FIG. 2. A set of double animation objects, created from the double animation class are grouped within a double animation collection object (see, animation collection classes 224) and executed to provide an animation behavior for one or more properties to which the animation collection object is attached.

| | DoubleAnimation | |
|---|---|---|
| Methods | BeginIn | Starts or restarts the animation at the specified offset from the current time. Inherited from DoubleTimedModifier. |
| | CloneCore | Implementation of CloneCore. |
| | CloneDownToUnchangeable | Returns an immutable copy of the specified object. Inherited from Changeable. |

| | DoubleAnimation |
|---|---|
| Copy | Creates a copy of this DoubleTimedModifier Inherited from DoubleTimedModifier. |
| Copy | Creates a copy of this DoubleModifier Inherited from DoubleModifier. |
| Copy | Returns a modifiable copy of the current object. The copy's IsChangeable property is true and its StatusOfNextUse is Unchangeable. Inherited from Changeable. |
| Disable | Disables this timeline, after which the timeline can no longer become active. The timeline can be re-enabled with a call to Enable. Inherited from DoubleTimedModifier. |
| DoubleAnimation | Initializes a new instance of the DoubleAnimation class. |
| EmbeddedChangeableReader | Accesses the specified Changeable data member, processes it, and returns a reference to the member. This reference should then be reassigned to the original member variable. Classes that derive from Changeable call this method on data members before they can be retrieved through property calls. Inherited from Changeable. |
| EmbeddedChangeableWriter | Processes a modified Changeable data member and returns a reference to the processed object. Inherited from Changeable. |
| Enable | Enables this timeline, parenting it to the timeline specified by the ParentTimeline property. This allows the timeline to become active. This method throws an exception if the ParentTimeline property is null. Inherited from DoubleTimedModifier. |
| EndIn | Schedules an interactive end time. Inherited from DoubleTimedModifier. |
| Equals | Determines whether two Object instances are equal. Inherited from Object. |
| FillInClone | Inherited from DoubleTimedModifier. |
| Finalize | Allows an Object to attempt to free resources and perform other cleanup operations before the Object is reclaimed by garbage collection. Inherited from Object. |
| GetHashCode | Serves as a hash function for a particular type, suitable for use in hashing algorithms and data structures like a hash table. Inherited from Object. |
| GetType | Gets the Type of the current instance. Inherited from Object. |
| GetValue | Calculates the value of the animation at the current time. |
| GetValueImpl | Implementation of the GetValue method. |
| IModifier.GetValue | Untyped GetValue interface method. |
| MakeUnchangeable | Makes an object immutable; after this method is called on a Changeable, its IsChangeable property is false. Inherited from Changeable. |
| MakeUnchangeableCore | MakeUnchangeableCore Inherited from Modifier. |
| MemberwiseClone | Creates a shallow copy of the current Object. Inherited from Object. |
| ModifyHandlerIfChangeable | Adds or removes a Changed event handler to or from the specified Changeable object, if the object is currently modifiable. If the specified object is not modifiable - if its IsChangeable property is false - this |

|  |  | DoubleAnimation |
|---|---|---|
|  |  | method has no effect. Inherited from Changeable. |
|  | OnChanged | Called when the current object is modified. Classes that derive from Changed should call this method after they have been modified. Inherited from Changeable. |
|  | op_Implicit | Implicitly creates an AnimationCollection from a DoubleModifier Inherited from DoubleModifier. |
|  | Pause | Pauses this timeline. Inherited from DoubleTimedModifier. |
|  | PropagateEventHandler | PropagateEventHandler is used by the Changeable base class. |
|  | ReadPreamble | Ensures that simple (non-Changeable) members are being accessed from a valid UI context. This method should be called before any simple members are accessed. Inherited from Changeable. |
|  | ReferenceEquals | Determines whether the specified Object instances are the same instance. Inherited from Object. |
|  | Resume | Resumes this timeline. Inherited from DoubleTimedModifier. |
|  | Seek | Moves the current position of the animation backwards or forwards from either the current time, the Begin time, or the End time. Inherited from DoubleTimedModifier. |
|  | SetDefaultParentTimeline | Sets the default parent timeline for the timeline used by this animation. |
|  | ToString | Returns a String that represents the current Object. Inherited from Object. |
|  | ValidateObjectState | Verifies that the current object has a valid state. If the object is in an invalid state, this method throws an exception. Inherited from Changeable. |
|  | WritePostscript | Causes the current object to validate itself and then invokes the OnChanged method. Inherited from Changeable. |
|  | WritePreamble | Ensures that simple (non-Changeable) members are being accessed from a valid user interface (UI) context. This method should be called before any simple members are set. Inherited from Changeable. |
| Properties | Acceleration | Gets or sets the fraction of the simple duration spent in the acceleration phase. Inherited from DoubleTimedModifier. |
|  | AllowChangeableReferenceOverride | Used in conjunction with the ChangeableUsageOverride type sent in as a parameter to ChangeableHelper.UseChangeable, to help determine when a Changeable being put into "use" should be promoted to "ChangeableReference". Inherited from Changeable. |
|  | AutoReverse | Gets or sets a value that indicates whether the animation plays in reverse after it completes its forward iteration. Inherited from DoubleTimedModifier. |
|  | Begin | Gets or sets an offset to the start time of the animation. Inherited from DoubleTimedModifier. |
|  | By | Gets or sets the total amount by which the animation changes its starting value. |
|  | CanMakeUnchangeable | True if this Changeable can be made unchangeable. Inherited from Changeable. |

| DoubleAnimation | |
|---|---|
| CurrentRepeat | Gets the number of the current iteration of the animation. Inherited from DoubleTimedModifier. |
| CurrentTime | Gets the current time value of the animation. Inherited from DoubleTimedModifier. |
| Deceleration | Gets or sets a value that represents the fraction of the simple duration spent in the deceleration phase. Inherited from DoubleTimedModifier. |
| Duration | Gets or sets the length of time the animation takes to complete a single forward iteration, also known as the simple duration of an animation. Inherited from DoubleTimedModifier. |
| End | Gets or sets the maximum end time of the animation. Inherited from DoubleTimedModifier. |
| EndSync | Gets or sets a TimeEndSync enumeration that specifies how the implicit duration of an animation is determined. This property is only used if the Duration property is not explicitly set. Inherited from DoubleTimedModifier. |
| Fill | Gets or sets a value that specifies the state of an object when its animation ends. Inherited from DoubleTimedModifier. |
| FillDefault | Gets or sets a value that indicates the default value of the Fill property of the current animation and its child timelines. Inherited from DoubleTimedModifier. |
| From | Gets or sets the starting value of an animation. |
| InterpolationMethod | The method used by the animation to interpolate between the KeyFrames. |
| IsAdditive | Set to true if you want the animation to compose with the base value or the previous animation in an animation collection. |
| IsChangeable | Gets a Boolean that indicates whether the object is currently modifiable. Inherited from Changeable. |
| IsChanging | Gets a value that indicates whether the animation is active. Inherited from DoubleTimedModifier. |
| IsCumulative | Set to true if you want the animation's output value to accumulate over its repetitions. |
| IsEnabled | True if the animation is Enabled. |
| IsForwardProgressing | Gets a value that indicates whether the animation is progressing from past to future. Inherited from DoubleTimedModifier. |
| IsOverridingBaseValue | Gets a value that indicates whether the animation is active or in a fill period. Inherited from DoubleTimedModifier. |
| IsPaused | Gets a value that indicates whether the animation is active and paused. Inherited from DoubleTimedModifier. |
| IsReversed | Gets a value that indicates whether the animation is currently moving in the opposite direction of its parent timeline. Inherited from DoubleTimedModifier. |
| KeyFrames | A list of KeyFrames describing different KeyValues, KeyTimes, and KeySplines the animation may use to calculate its output values. |
| ParentTimeline | Gets or sets the default parent timeline of the animation. Inherited from DoubleTimedModifier. |

-continued

| | DoubleAnimation | |
|---|---|---|
| | Progress | Gets a number from 0 to 1 that indicates the fraction of the simple duration that has elapsed. Inherited from DoubleTimedModifier. |
| | RepeatCount | Gets or sets the number of times an animation should repeat. Inherited from DoubleTimedModifier. |
| | RepeatDuration | Gets or sets the total length of time the animation should play. If this value is greater than the simple duration of the animation, it will repeat itself for the length of time specified by this property. Inherited from DoubleTimedModifier. |
| | Restart | Gets or sets the animation's behavior when it is told to restart - that is, how the animation behaves when a second begin time is reached. Inherited from DoubleTimedModifier. |
| | RestartDefault | Gets or sets the default value of the Restart property of the current animation and its child timelines. Inherited from DoubleTimedModifier. |
| | Speed | Gets or sets the relative speed at which time should pass for the animation, compared to its parent timeline. Inherited from DoubleTimedModifier. |
| | StatusOfNextUse | Gets or sets a UseStatus enumeration that specifies how the Changeable object behaves when it is "used." A Changeable object is considered used in the following situations: the object is set into a Property System property, the object is used as a sub-object in a complex Changeable object, or the object is used in a DrawingContext command. Inherited from Changeable. |
| | Timeline | Returns the Timeline associated with this animation. |
| | To | Gets or sets the ending value of the animation. |
| | UIContext | Gets the UIContext of the current object. The UIContext is used for maintaining thread safety. Inherited from Changeable. |
| | UsesBaseValue | Returns true if the animation needs the base value to compute its output value. |
| Events | Begun | Raised by a timeline when it begins an active duration. Inherited from DoubleTimedModifier. |
| | Changed | Occurs when the current object is modified. Inherited from Changeable. |
| | Ended | Raised by a timeline when it ends an active duration. Inherited from DoubleTimedModifier. |
| | Paused | Raised by a timeline when it is implicitly or explicitly paused. Inherited from DoubleTimedModifier. |
| | Repeated | Raised by a timeline when it repeats an active duration. Inherited from DoubleTimedModifier. |
| | Resumed | Raised by a timeline when it is resumed from a paused. Inherited from DoubleTimedModifier. |
| | Reversed | Raised by a timeline when it reverses direction. Inherited from DoubleTimedModifier. |
| | Seeked | Raised by a timeline when its progress or simple time change as a result of a seek operation. Inherited from DoubleTimedModifier. |

DoubleAnimationCollection

The DoubleAnimationCollection object class, described herein below, represents a set of double animation objects. The set of members making up the DoubleAnimationCollection object class are described in the table presented below.

| | | |
|---|---|---|
| Methods | Add | The Add(DoubleModifier) and Add(Object) methods add animations to the collection. The Add(Double,DoubleAnimationCollection) method calculates the current value of the specified collection based on the specified base value. |
| | AddChild | Implementation of AddChild. Adds a Modifier to this AnimationCollection from Markup. |
| | AddText | Implementation of AddText. This is not implemented on this class. |
| | Apply | Implementation of Apply. Applies an animation collection in markup to an element. |
| | Clear | Clears the collection by setting the collection's Count to 0. |
| | CloneCore | CloneCore |
| | CloneDownToUnchangeable | Returns an immutable copy of the specified object. Inherited from Changeable. |
| | Contains | Returns a Boolean that indicates whether the collection contains the specified DoubleModifier. |
| | Copy | Creates a copy of this DoubleAnimationCollection. |
| | Copy | Returns a modifiable copy of the current object. The copy's IsChangeable property is true and its StatusOfNextUse is Unchangeable. Inherited from Changeable. |
| | CopyTo | Copies the entire DoubleAnimationCollection to the specified one-dimensional array, starting at the specified index of the target array. |
| | Disable | Reduces the enabled count on the collection and if it reaches zero Disables the animations on the collection. |
| | DisableImpl | Implementation of the Disable method. |
| | DoubleAnimationCollection | Creates an empty DoubleAnimationCollection with a default capacity for a single animation. |
| | EmbeddedChangeableReader | Accesses the specified Changeable data member, processes it, and returns a reference to the member. This reference should then be reassigned to the original member variable. Classes that derive from Changeable call this method on data members before they can be retrieved through property calls. Inherited from Changeable. |
| | EmbeddedChangeableWriter | Processes a modified Changeable data member and returns a reference to the processed object. Inherited from Changeable. |
| | Enable | Increases the enabled count on the collection. If it goes above zero then all of the animations in the collection are Enabled. |
| | EnableImpl | Implmentation of the Enable method. |
| | Equals | Determines whether two Object instances are equal. Inherited from Object. |
| | Finalize | Allows an Object to attempt to free resources and perform other cleanup operations before the Object is reclaimed by garbage collection. Inherited from Object. |
| | GetEnumerator | GetEnumerator Inherited from AnimationCollection. |
| | GetEnumeratorImpl | Returns an object that can be used to enumerate items in the list. |
| | GetHashCode | Serves as a hash function for a particular type, suitable for use in hashing |

|            |                              | -continued                                                                                                                                                                                                                                                                         |
|------------|------------------------------|-----|
|            |                              | algorithms and data structures like a hash table. Inherited from Object. |
|            | GetType                      | Gets the Type of the current instance. Inherited from Object. |
|            | GetValue                     | Returns the current value of the animation. |
|            | GetValueImpl                 | Provides a Modifier at a given index. |
|            | IndexOf                      | Returns the index of a given animation in the collection. |
|            | Insert                       | Inserts a given animation at a given index into the collection. |
|            | MakeUnchangeable             | Makes an object immutable; after this method is called on a Changeable, its IsChangeable property is false. Inherited from Changeable. |
|            | MakeUnchangeableCore         | Implementation of MakeUnchangeableCore. |
|            | MemberwiseClone              | Creates a shallow copy of the current Object. Inherited from Object. |
|            | ModifyHandlerIfChangeable    | Adds or removes a Changed event handler to or from the specified Changeable object, if the object is currently modifiable. If the specified object is not modifiable—if its IsChangeable property is false—this method has no effect. Inherited from Changeable. |
|            | OnChanged                    | OnChanged |
|            | PropagateEventHandler        | Implementation of PropagateEventHandler. |
|            | ReadPreamble                 | Ensures that simple (non-Changeable) members are being accessed from a valid UI context. This method should be called before any simple members are accessed. Inherited from Changeable. |
|            | ReferenceEquals              | Determines whether the specified Object instances are the same instance. Inherited from Object. |
|            | Remove                       | Removes a given animation from the collection. |
|            | RemoveAt                     | Removes an animation at a given index from the collection. |
|            | SetDefaultParentTimeline     | Inherited from AnimationCollection. |
|            | SetValueImpl                 | Sets a Modifier at a given index. |
|            | ToString                     | Returns a String that represents the current Object. Inherited from Object. |
|            | ValidateObjectState          | Verifies that the current object has a valid state. If the object is in an invalid state, this method throws an exception. Inherited from Changeable. |
|            | WritePostscript              | Causes the current object to validate itself and then invokes the OnChanged method. Inherited from Changeable. |
|            | WritePreamble                | Ensures that simple (non-Changeable) members are being accessed from a valid user interface (UI) context. This method should be called before any simple members are set. Inherited from Changeable. |
| Properties | AllowChangeableReferenceOverride | Used in conjunction with the ChangeableUsageOverride type sent in as a parameter to ChangeableHelper.UseChangeable, to help determine when a Changeable being put into "use" should be promoted to "ChangeableReference". Inherited from Changeable. |
|            | AnimationType                | AnimationType |
|            | CanMakeUnchangeable          | True if this Changeable can be made unchangeable. Inherited from Changeable. |
|            | Count                        | The number of animations in the collection. |
|            | CountImpl                    | Implementation of the Count property. |
|            | Empty                        | An unchangeable empty DoubleAnimationCollection. |

|   |   |   |
|---|---|---|
| | IsChangeable | Gets a Boolean that indicates whether the object is currently modifiable. Inherited from Changeable. |
| | IsChanging | Returns true if at least one of the animations in the animation list is currently active. Inherited from AnimationCollection. |
| | IsFixedSize | See IList.IsFixedSize |
| | IsOverridingBaseValue | Returns true if at least one of the animations in the animation list is currently on. Inherited from AnimationCollection. |
| | IsReadOnly | See IList.IsReadOnly |
| | IsSynchronized | See ICollection.IsSynchronized |
| | IsUsingBaseValue | Returns true if this animation collection needs the base value to compute its output value. |
| | IsUsingBaseValueImpl | The implementation of IsUsingBaseValue. |
| | Item | Gets the animation at a given index in this collection. |
| | Item | Use this to get or set a Modifier at a given index. Inherited from AnimationCollection. |
| | StatusOfNextUse | Gets or sets a UseStatus enumeration that specifies how the Changeable object behaves when it is "used." A Changeable object is considered used in the following situations: the object is set into a Property System property, the object is used as a sub-object in a complex Changeable object, or the object is used in a DrawingContext command. Inherited from Changeable. |
| | SyncRoot | See ICollection.SyncRoot |
| | UIContext | Gets the UIContext of the current object. The UIContext is used for maintaining thread safety. Inherited from Changeable. |
| Events | Changed | Occurs when the current object is modified. Inherited from Changeable. |

DoubleKeyFrame

A DoubleKeyFrame class is used to specify one KeyFrame for a DoubleAnimation. Two KeyFrames are utilized in a DoubleKeyFrame collection object. The two KeyFrame objects generally correspond to a From-To animation. The benefit of using KeyFrames is that there is no limit to the number of values (through a sequence of KeyFrames) you can specify for an animation object's timeline. The KeyFrames specify which time each of the values occurs relative to the duration of an animation and KeySplines can be specified to create acceleration and deceleration effects on each KeyFrame. The members of the DoubleKeyFrame class are provided below.

|   |   |   |
|---|---|---|
| Methods | DoubleKeyFrame | Creates a new DoubleKeyFrame |
| | Equals | Indicates whether this instance and a specified object are equal. Inherited from ValueType. |
| | Finalize | Allows an Object to attempt to free resources and perform other cleanup operations before the Object is reclaimed by garbage collection. Inherited from Object. |
| | GetHashCode | Returns the hash code for this instance. Inherited from ValueType. |
| | GetType | Gets the Type of the current instance. Inherited from Object. |
| | MemberwiseClone | Creates a shallow copy of the current Object. Inherited from Object. |
| | ReferenceEquals | Determines whether the specified Object instances are the same instance. Inherited from Object. |
| | ToString | Returns the fully qualified type name of this instance. Inherited from ValueType. |
| Properties | KeySpline | The KeySpline associated with this KeyFrame |
| | KeyTime | The KeyTime associated with this KeyValue |
| | Value | The value associated with this KeyFrame |

DoubleKeyFrameCollection

A DoubleAnimation has a KeyFrames property of type DoubleKeyFrameCollection. The user chooses to specify From, To, By values or add KeyFrames to the collection.

The members of the DoubleKeyFrameCollection are provided below.

| Methods | | |
|---|---|---|
| | Add | Strongly typed implementation of Add. |
| | CloneCore | Implementation of CloneCore. |
| | CloneDownToUnchangeable | Returns an immutable copy of the specified object. Inherited from Changeable. |
| | Copy | Returns a modifiable copy of the current object. The copy's IsChangeable property is true and its StatusOfNextUse is Unchangeable. Inherited from Changeable. |
| | Copy | Creates a copy of this DoubleKeyFrameCollection. |
| | DoubleKeyFrameCollection | Creates a new DoubleKeyFrameCollection |
| | EmbeddedChangeableReader | Accesses the specified Changeable data member, processes it, and returns a reference to the member. This reference should then be reassigned to the original member variable. Classes that derive from Changeable call this method on data members before they can be retrieved through property calls. Inherited from Changeable. |
| | EmbeddedChangeableWriter | Processes a modified Changeable data member and returns a reference to the processed object. Inherited from Changeable. |
| | Equals | Determines whether two Object instances are equal. Inherited from Object. |
| | Finalize | Allows an Object to attempt to free resources and perform other cleanup operations before the Object is reclaimed by garbage collection. Inherited from Object. |
| | GetCurrentSegmentValues | Returns the current segment values of this KeyFrameCollection. |
| | GetHashCode | Serves as a hash function for a particular type, suitable for use in hashing algorithms and data structures like a hash table. Inherited from Object. |
| | GetType | Gets the Type of the current instance. Inherited from Object. |
| | MakeUnchangeable | Makes an object immutable; after this method is called on a Changeable, its IsChangeable property is false. Inherited from Changeable. |
| | MakeUnchangeableCore | Makes a Changeable object immutable. Inherited from Changeable. |
| | MemberwiseClone | Creates a shallow copy of the current Object. Inherited from Object. |
| | ModifyHandlerIfChangeable | Adds or removes a Changed event handler to or from the specified Changeable object, if the object is currently modifiable. If the specified object is not modifiable-if its IsChangeable property is false-this method has no effect. Inherited from Changeable. |
| | OnChanged | Called when the current object is modified. Classes that derive from Changed should call this method after they have been modified. Inherited from Changeable. |
| | PropagateEventHandler | Shares a Changed event handler with the current object's data members or removes it. Inherited from Changeable. |
| | ReadPreamble | Ensures that simple (non-Changeable) members are being accessed from a valid UI context. This method should be called before any simple members |

| | | -continued |
|---|---|---|
| | | are accessed. Inherited from Changeable. |
| | ReferenceEquals | Determines whether the specified Object instances are the same instance. Inherited from Object. |
| | ToString | Returns a String that represents the current Object. Inherited from Object. |
| | Validate | Ensures that the KeyFrames specified in this collection do not conflict with each other. |
| | ValidateObjectState | Implementation of ValidateObjectState. |
| | WritePostscript | Causes the current object to validate itself and then invokes the OnChanged method. Inherited from Changeable. |
| | WritePreamble | Ensures that simple (non-Changeable) members are being accessed from a valid user interface (UI) context. This method should be called before any simple members are set. Inherited from Changeable. |
| Properties | AllowChangeableReferenceOverride | Used in conjunction with the ChangeableUsageOverride type sent in as a parameter to ChangeableHelper.UseChangeable, to help determine when a Changeable being put into "use" should be promoted to "ChangeableReference". Inherited from Changeable. |
| | CanMakeUnchangeable | True if this Changeable can be made unchangeable. Inherited from Changeable. |
| | Count | The number of KeyFrames in this collection. |
| | Destination | The value specified in the last KeyFrame in the collection. |
| | IsChangeable | Gets a Boolean that indicates whether the object is currently modifiable. Inherited from Changeable. |
| | Item | Gets the KeyFrame at a given index for the collection. |
| | StatusOfNextUse | Gets or sets a UseStatus enumeration that specifies how the Changeable object behaves when it is "used." A Changeable object is considered used in the following situations: the object is set into a Property System property, the object is used as a sub-object in a complex Changeable object, or the object is used in a DrawingContext command. Inherited from Changeable. |
| | UIContext | Gets the UIContext of the current object. The UIContext is used for maintaining thread safety. Inherited from Changeable. |
| Events | Changed | Occurs when the current object is modified. Inherited from Changeable. |

KeyTime

A KeyTime class is used as the value of the KeyTime property on a KeyFrame class. This can either be a percentage of the duration or a specific time relative to the beginning of the animation. The members of the KeyTime class are provided herein below.

| Methods | CanBeLastKeyTime | Determines whether this KeyTime is valid for a last KeyFrame. |
|---|---|---|
| | Equals | Indicates whether this instance and a specified object are equal. Inherited from ValueType. |

|  |  |  |
|---|---|---|
|  | Finalize | Allows an Object to attempt to free resources and perform other cleanup operations before the Object is reclaimed by garbage collection. Inherited from Object. |
|  | GetHashCode | Returns the hash code for this instance. Inherited from ValueType. |
|  | GetType | Gets the Type of the current instance. Inherited from Object. |
|  | GetValue | Calculates the time value of the KeyTime with respect to the duration of the animation using this KeyTime. |
|  | KeyTime | Creates a new KeyTime |
|  | MemberwiseClone | Creates a shallow copy of the current Object. Inherited from Object. |
|  | ReferenceEquals | Determines whether the specified Object instances are the same instance. Inherited from Object. |
|  | ToString | Returns the fully qualified type name of this instance. Inherited from ValueType. |
| Properties | CanBeFirstKeyTime | Returns true if this KeyTime is valid for a first KeyFrame. This is the case if it is unspecified, a percent value of 0.0, or a Time value of 0. |
|  | Percent | The percent value of this KeyTime if one has been set. If one has not been set getting this value will throw an exception. |
|  | Time | The Time value of this KeyTime if one has been set. If one has not been set getting this value will throw an exception. This value can only be set to a Finite Time or Time.Unspecified; |
|  | Type | The type of this KeyTime. |

KeySpline

A KeySpline class structure is used as the value for the KeySpline property on a KeyFrame structure (provided above). It specifies the way in which a KeyFrame will move into the next KeyFrame. In an embodiment of the invention, the KeySpline property will be ignored on the last KeyFrame. The members of the KeySpline class are provided below.

|  |  |  |
|---|---|---|
| Methods | Equals | Compares two key splines for exact equality. |
|  | Equals | Indicates whether this instance and a specified object are equal. Inherited from ValueType. |
|  | Finalize | Allows an Object to attempt to free resources and perform other cleanup operations before the Object is reclaimed by garbage collection. Inherited from Object. |
|  | GetHashCode | Calculates a hash code for this key spline. |
|  | GetType | Gets the Type of the current instance. Inherited from Object. |
|  | KeySpline | Double constructor |
|  | MemberwiseClone | Creates a shallow copy of the current Object. Inherited from Object. |
|  | op_Equality | Compares two key splines for exact equality. |
|  | op_Inequality | Compares two key splines for exact equality. |
|  | Progress | Calculates spline progress at a given [0, 1] "time" |
|  | ReferenceEquals | Determines whether the specified Object instances are the same instance. Inherited from Object. |
|  | ToString | Creates a string representation of the values in the enumerator. |
| Properties | ControlPoint0 | The first control point used to define the shape of the KeySpline. |
|  | ControlPoint1 | The second control point used to define the shape of the KeySpline. |
|  | IsSpecified | True if control point values have been specifed for this KeySpline. |

It will be appreciated by those skilled in the art that a new exemplary platform and exemplary interfaces, classes and structures incorporated therein have been described for attaching and executing animation behaviors to graphical display elements within a computing environment including graphical output devices such as a graphical user interface display. In view of the many possible environments to which the principles of this invention may be applied and the flexibility of designing and carrying out the above-described animation architecture, it should be recognized that the embodiments described herein are meant to be illustrative and should not be taken as limiting the scope of invention. Those skilled in the art to which the present invention applies will appreciate that the illustratively presented embodiments can be modified in arrangement and detail without departing from the spirit of the invention. Therefore, the invention as described herein contemplates all such embodiments as may come within the scope of the following claims and equivalents thereof.

What is claimed is:

1. A computer-readable medium which stores a set of instructions which when executed performs a method for supporting timed modification of element property values, the method comprising:
    an animation object class, from which an animation object is initiated, providing a time-varying value definition and including an interface supporting designating:
        animation behavior properties, the animation behavior properties comprising a base property value, a to property specifying an ending animation value, a from property specifying a starting animation value, and a by property specifying a difference between the ending animation value and the starting animation value wherein, to initiate the animation object, the animation object class use a process that receives the base property value and returns a value based on the process's internal modifier definition computation of a progress value;
        timing properties, the timing properties comprising a current time property configured to provide a current local time to a timeline for the animation object and a parent time line property configured to designate a timeline that is the timing parent of the animation object's timeline;
        a set of commands controlling the progression of the animation displayed on a display device; and
        a set of events for providing notifications relating to the status of the animation object.

2. The computer-readable medium of claim 1 further comprising an animation collection object class providing a container for a set of animation objects created from the animation object class, the animation collection object class including an interface supporting designating:
    animation collection properties defining:
        the set of animation objects within an animation collection object;
        a current status of the animation collection object; and animation collection methods for:
            configuring the set of animation objects within the animation collection object; and
            retrieving a current animation collection value derived from individual values provided by the set of animation objects.

3. The computer-readable medium of claim 1 further comprising a key frame object class for specifying a key frame property within an animation object, the key frame object class including:
    a set of properties enabling designating:
        a key spline;
        a key time; and
        a value.

4. The computer-readable medium of claim 3 further comprising a key frame collection object class for specifying a set of key frame objects for specifying a sequence of frames within a timeline for an animation object.

5. The computer-readable medium of claim 1 wherein a float animation object class provides a time changing floating point value.

6. The computer-readable medium of claim 1 wherein a double animation object class provides a time-changing double precision floating point value.

7. The computer-readable medium of claim 1 wherein a rectangle animation object class provides a time-changing top, left position of a defined rectangle.

8. The computer-readable medium of claim 1 wherein a color animation object class provides a time-changing color value.

9. The computer-readable medium of claim 1 wherein a Boolean animation class provides a time-changing Boolean value.

10. The computer-readable medium of claim 1 wherein the process comprises a GetValue method.

11. A method for supporting timed modification of element property values, the method comprising:
    an animation object class, from which an animation object is initiated, providing a time-varying value definition and including an interface supporting designating:
        animation behavior properties, the animation behavior properties comprising a base property value, a to property specifying an ending animation value, a from property specifying a starting animation value, and a by property specifying a difference between the ending animation value and the starting animation value wherein, to initiate the animation object, the animation object class use a process that receives the base property value and returns a value based on the process's internal modifier definition computation of a progress value wherein the process comprises a GetValue method;
        timing properties, the timing properties comprising a current time property configured to provide a current local time to a timeline for the animation object and a parent time line property configured to designate a timeline that is the timing parent of the animation object's timeline;
        a set of commands controlling the progression of the animation displayed on a display device; and
        a set of events for providing notifications relating to the status of the animation object.

12. The method of claim 11 further comprising an animation collection object class providing a container for a set of animation objects created from the animation object class, the animation collection object class including an interface supporting designating:
    animation collection properties defining:
        the set of animation objects within an animation collection object;
        a current status of the animation collection object; and animation collection methods for:
            configuring the set of animation objects within the animation collection object; and
            retrieving a current animation collection value derived from individual values provided by the set of animation objects.

13. The method of claim 11 further comprising a key frame object class for specifying a key frame property within an animation object, the key frame object class including:
    a set of properties enabling designating:
        a key spline;
        a key time; and
        a value.

14. The method of claim 13 further comprising a key frame collection object class for specifying a set of key frame objects for specifying a sequence of frames within a timeline for an animation object.

15. The method of claim 11 wherein a float animation object class provides a time changing floating point value.

16. The method of claim 11 wherein a double animation object class provides a time-changing double precision floating point value.

17. The method of claim 11 wherein a rectangle animation object class provides a time-changing top, left position of a defined rectangle.

18. The method of claim 11 wherein a color animation object class provides a time-changing color value.

19. The method of claim 11 wherein a Boolean animation class provides a time-changing Boolean value.

20. A system for supporting timed modification of element property values, the system comprising:
- a memory storage for maintaining a database; and
- a processing unit coupled to the memory storage, wherein the processing unit is operative to:
  - initiate an animation object from an animation object class;
  - provide a time-varying value definition; and
  - designate via an interface:
    - animation behavior properties, the animation behavior properties comprising a base property value, a to property specifying an ending animation value, a from property specifying a starting animation value, and a by property specifying a difference between the ending animation value and the starting animation value wherein, to initiate the animation object, the animation object class use a process that receives the base property value and returns a value based on the process's internal modifier definition computation of a progress value;
  - timing properties, the timing properties comprising a current time property configured to provide a current local time to a timeline for the animation object and a parent time line property configured to designate a timeline that is the timing parent of the animation object's timeline;
  - a set of commands controlling the progression of the animation displayed on a display device; and
  - a set of events for providing notifications relating to the status of the animation object.

* * * * *